United States Patent [19]

Veale

[11] Patent Number: 4,458,322

[45] Date of Patent: Jul. 3, 1984

[54] CONTROL OF PAGE STORAGE AMONG THREE MEDIA USING A SINGLE CHANNEL PROCESSOR PROGRAM AND A PAGE TRANSFER BUS

[75] Inventor: John R. Veale, Manhattan Beach, Calif.

[73] Assignee: Manhattan Engineering Co., Inc., Manhattan Beach, Calif.

[21] Appl. No.: 275,416

[22] Filed: Jun. 19, 1981

[51] Int. Cl.³ .............................................. G05B 1/02
[52] U.S. Cl. .................................... 364/571; 307/264; 307/491; 318/560; 318/632; 340/347 SY
[58] Field of Search ................ 364/571, 487; 307/425, 307/491, 511, 234, 350, 354, 264; 356/358, 226; 324/76 R, 77 A, 77 K, 83 FE; 328/115, 149, 165; 318/560, 572, 632, 633, 640; 340/347 P, 347 SY

[56] References Cited

U.S. PATENT DOCUMENTS

| | | | |
|---|---|---|---|
| 3,705,400 | 12/1972 | Cordes, Jr. | 364/571 |
| 3,797,300 | 3/1974 | Sato | 364/571 |
| 4,079,302 | 3/1978 | Norton | 318/632 |
| 4,097,860 | 6/1978 | Araseki et al. | 364/571 |
| 4,109,189 | 8/1978 | Jacques et al. | 318/632 |
| 4,254,469 | 3/1981 | Whitely | 364/571 |

OTHER PUBLICATIONS

Prazak et al.; "Correcting Errors Digitally in Data Acquisition and Control"; *Electronics;* vol. 52, No. 24; Nov. 22, 1979; pp. 123–128.

Primary Examiner—Errol A. Krass
Attorney, Agent, or Firm—Robert J. Schaap

[57] ABSTRACT

Digital error correcting circuitry is disclosed which processes two analog output signals from an incremental position optical encoder to correct for both offset and amplitude errors. The peak amplitude values of the analog signals are stored in a digital storage register and are used to calculate bias signals of the proper polarity and amplitude to cancel the offset errors in each of the encoder signals. The peak amplitude values are also used to generate an amplitude correction factor which is applied to one of the encoder signals to correct the peak-to-peak amplitude of that signal so that it is equal to the peak-to-peak amplitude of the other encoder signal.

27 Claims, 5 Drawing Figures

CONTROL OF PAGE STORAGE AMONG THREE MEDIA USING A SINGLE CHANNEL PROCESSOR PROGRAM AND A PAGE TRANSFER BUS

BACKGROUND OF THE INVENTION

This invention relates to error correcting circuitry and more particularly to digital error correcting circuitry for use in servo control systems and which may be implemented inexpensively for use in industrial and commercial applications.

High accuracy servo control systems have been used for many years in a variety of military and aerospace applications to position movable control members. Such applications include the positioning of antennas and optical sensors. A key element in these control systems is the position transducer used to determine the position of the movable control member, since the overall performance of the control system is a function of the accuracy, repeatability and linearity of the position transducer. Historically, many types of transducers have been employed to measure position such as potentiometers, resolvers, differential transformers, magnetic encoders, optical encoders and the like.

Several of these types of transducers provide position determining signals having a periodic waveform. These signals may be in the form of sine or cosine waves, where the amplitude, slope and polarity of the waveforms may be used to determine the position of the movable control member. One such transducer of this type is the incremental position optical encoder which includes a light source and a group of photo sensors. Placed between the light source and the photo sensors are a fixed reticle and a movable disk which is mounted to a rotatable control member. The disk and reticle are each provided with a pattern of clear apertures and opaque areas. As the movable disk rotates with the control member, light paths from the light source to the photo sensors are created by the juxtaposition of the apertures in the disk and the reticle. The light paths are detected by the photo sensors which are positioned with respect to the disks to create two output signals in response to the rotation of the moving disk. These two signals are typically in the form of sine or cosine waves displaced in phase ninety degrees with respect to each other. Each of the sine and cosine waves represent the incremental rotation of the movable disk by a distance equal to the spacings between apertures.

Counting the number of sine or square waves that occur as the control member rotates provides a determination of the position of the member. Prior art techniques have also been developed for counting the number of zero crossings which occur in the encoder output signals. These techniques permit resolving the position of the motor shaft into four parts for each of the apertures in the disk pattern. Techniques have also been developed to measure the slopes of the encoder signal waveforms to provide increased resolution of the shaft position.

In practice, the encoder output signals include errors in both offset and amplitude due to mechanical and electrical tolerances of the components used in the encoder construction. To correct for these errors, prior art control systems provide a variety of manually adjustable circuit elements, usually in the form of potentiometers. These elements must be individually adjusted by trained personnel using electronic test equipment to verify the adjustments. It is the nature of the signal errors that they may vary as a function of time and temperature due to component tolerance drift. Accordingly, even though the control system circuit is initially adjusted to correct for signal errors, such adjustments must be repeated at regular intervals during the use of the control system to maintain control accuracy. These adjustments are costly to perform and are dependent upon the skill of the service personnel. Further, there is no way to compensate for variations in signal errors which occur between intervals of adjustment.

Accordingly, it is an object of the present invention to provide new and improved error-correcting circuitry for use in servo control systems.

It is another object of the present invention to provide digital error-correcting circuitry which automatically compensates for signal errors without requiring manual adjustments.

It is still another object of the present invention to provide digital error-correcting circuitry which automatically revises the signal error compensation to account for error variations.

It is still another object of the present invention to provide digital error-correcting circuitry which automatically compensates for both offset errors and amplitude errors.

SUMMARY OF THE INVENTION

The foregoing and other objects of the invention are accomplished by digital circuitry which processes the analog output signals from an incremental position optical encoder to correct for both offset and amplitude errors. The encoder provides output signals representing the position of a movable control element to a servo control system used to position the control element.

Offset errors are those errors which cause the encoder output signals to be non-symmetric with respect to a pre-established zero baseline. Amplitude errors are those errors which cause the peak-to-peak amplitudes of the encoder signals to differ in magnitude from one another.

In the error-correcting circuitry of the present invention, each of two analog output signals from the encoder are converted to digital form by means of a multiplexed analog-to-digital converter. The first and second encoder signals are, in turn, provided as input signals to a digital peak detector circuit. The purpose of the peak-detector detector is to detect both the minimum and maximum peak amplitude values of the encoder signals. In response to a storage command signal, the peak amplitude values are stored in a digital storage register which in turn provides these peak values to a digital bias determining circuit.

The bias determining circuit employs the peak value signals to generate first and second bias signals of the proper polarity and amplitude to exactly cancel the offset errors in each of the first and second encoder signals. The bias signals, along with the encoder signals, are provided as input signals to a digital offset correction circuit which applies the bias signals to the encoder signals to generate first and second offset corrected encoder signals.

The peak value signals and one of the offset corrected encoder signals are also provided as input signals to a digital amplitude correction circuit. This circuit employs the peak value signals to generate an amplitude correction factor which it applied to the first offset corrected encoder signal to correct the peak-to-peak amplitude of that signal so that it is equal in amplitude to the second encoder signal. The amplitude and offset corrected encoder signals are provided as input signals to a servo control system where they are employed to effect accurate positioning of the movable control member. By periodically renewing the contents of the storage register, the circuitry of the present invention is capable of automatically revising the error correction factors to account for encoder output signal error drift.

The error correction circuitry of the present invention provides completely automatic error correction in a simple and inexpensive manner. In addition, no user adjustments are required, resulting in a more cost-effective and more accurate servo control system.

DESCRIPTION OF THE PREFERRED EMBODIMENT

Figures 2, 3:
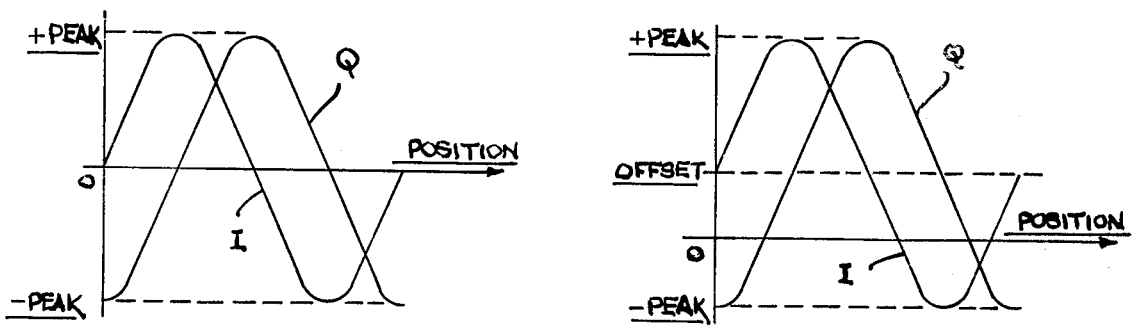
FIG. 2 is a graphic illustration showing ideal output signals from the encoder of FIG. 1.
FIG. 3 is a graphic illustration showing output signals from the encoder of FIG. 1 which include offset errors.

FIG. 2 illustrates the operation of an incremental position optical shaft encoder 12 used to determine the position of a movable control member 33. The encoder 12 includes a light source 14 which may be in the form of a light-emitting diode and which is illuminated by a power supply 16. A group of photo sensors 18 and 20 are positioned to receive light from the light source 14. Mounted between the light source 14 and the photo sensors 18 and 20 are a movable disk 24 and a fixed reticle 26. The fixed reticle 26 is mounted to a frame 28 of the encoder 12 which also supports the light source 14 and the photo sensors 18 and 20. The movable disk 24 is axially mounted to one end of output shaft 30 of a dynamically movable drive member in the form of a motor 32. The movable control member or load 33 is mounted to the opposite end of the shaft 30. The motor 32 is driven by a motor drive signal appearing on line 34 in response to the operation of a servo control system used to position the control member 33 as described below.

The disk 24 and the reticle 26 may be constructed of thin sheets of glass. The surfaces of the disk 24 and the reticle 26 are each provided with patterns of equally spaced clear and opaque segments which may be formed by means such as photographic imprinting. The clear segments are in the form of narrow apertures 36 equally spaced along the disk 24 and the reticle 26.

Energizing the motor 32 causes the movable disk 24 to rotate with respect to the fixed reticle 26. The relative orientation of the apertures 36 of the disk 24 and the reticle 26 produce light paths from the light source 14 to the photo sensors 18 and 20. These light paths are in the form of Moire fringes which occur in a periodic pattern in response to the rotation of the disk 24. These fringes are detected by the photo sensors 18 and 20 in response to the light rays emitted from the light source 14 and which pass through selected apertures 36 in the disks 24 and 26 in response to the angular position of the movable disk 24 and, hence, the position of the member 33. Rotation of the movable disk 24 by an amount equal to the distance between adjacent apertures 36 creates a single fringe. In a manner well known to those skilled in the art, for constant speed rotation of the motor shaft 30, the fringes are created in succession corresponding to the equal spacing of the apertures 36 around the periphery of the disk 24. The photo sensors 18 and 20 are positioned with respect to the disk 24 and the reticle 26 so that the light received by these sensors produces an in-phase signal at output line 42 from the photo sensor 18 and also produces a quadrature signal at output line 44 from the photo sensor 20.

Figure 1:
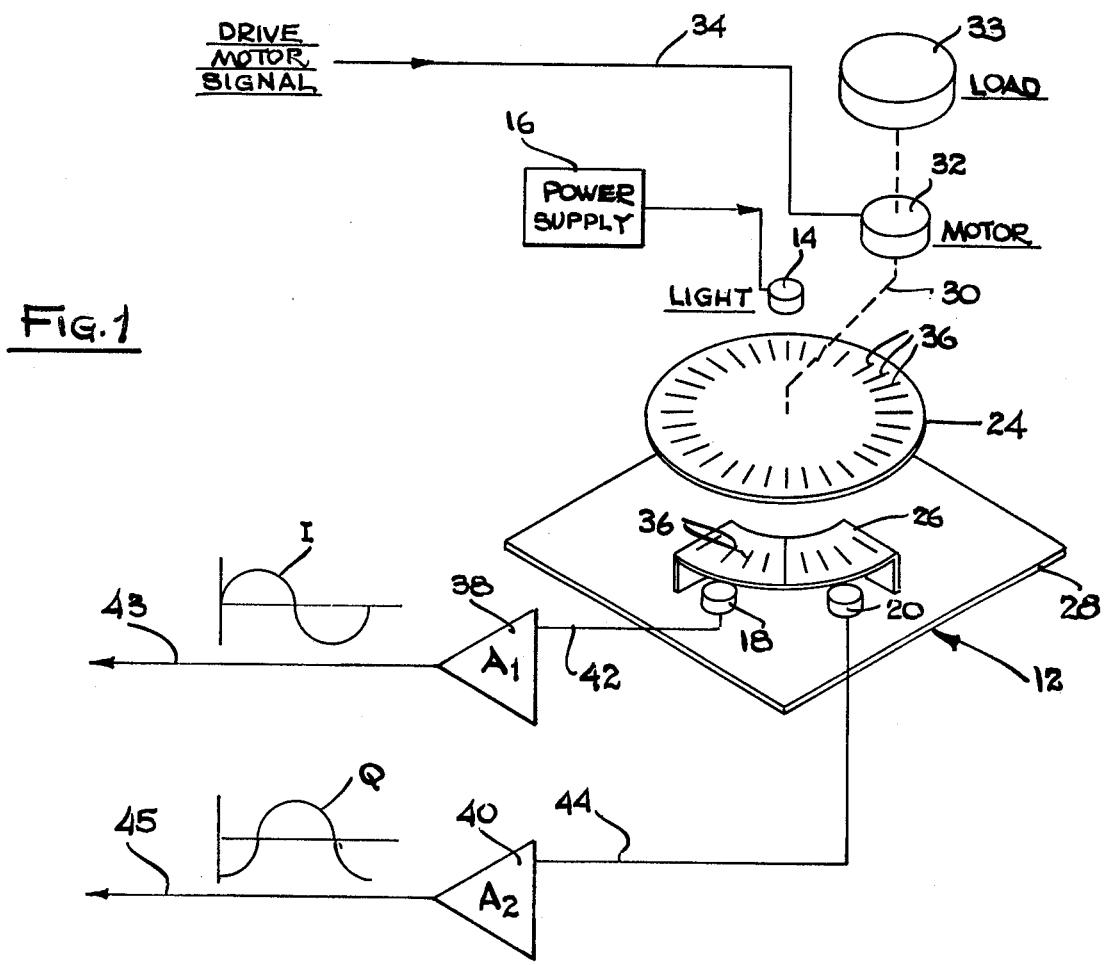
FIG. 1 is a schematic illustration showing an incremental position optical shaft encoder used in the digital positioning system of the present invention, and output waveforms generated therefrom.

As shown in FIG. 1, the output signals from the photo sensors 18 and 20, which are typically in the form of photo diodes, are amplified, respectively, by the amplifiers 38 and 40, resulting in in-phase and quadrature signals shown by wave forms I and Q, appearing on lines 43 and 45, respectively. The wave form I is in the shape of a sine wave with one full cycle of the sine wave being generated in response to each fringe created by the movement of the disk 24. Similarly, the waveform Q is in the form of a cosine wave with one full cycle of the cosine wave being generated in response to each fringe.

A variety of incremental position optical shaft encoders of the type described above are commercially available, such as encoder type R-1500, manufactured by Electro-Craft Corporation, Hopkins, Minnesota, and encoder type L-25, manufactured by BEI Electronics, Inc., Little Rock, Arkansas. One technique for using these types of encoders to determine position is by counting the number of fringes generated as the disk 24 rotates. Fringe counting is accomplished by detecting each zero crossing occurrence of the waveforms I and Q. Another technique for using incremental position encoders to determine position is by measuring the relative slopes of the waveforms I and Q. Accordingly, the accuracy of the position determination is a function both of the relative amplitudes of the waveforms I and Q, and of the relationship of the waveforms I and Q to a zero baseline.

FIG. 2 is a graphic illustration of the waveforms of the in-phase signal I and the quadrature signal Q from the encoder 12, both plotted on a common horizontal axis representing the position of the movable disk 24. The waveforms shown in FIG. 2 represent the output signals I and Q produced when the disk 24 moves from a zero position corresponding to the beginning of a fringe, to a position corresponding to the end of a single fringe. The waveforms I and Q are seen to represent sine and cosine waves, respectively, which are separated in phase by ninety degrees.

Under ideal conditions the signals I and Q are perfectly symmetrical about a zero baseline as represented by the waveforms shown in FIG. 2. However, due to manufacturing tolerances in the construction of incremental encoders, the signals I and Q include errors in both offset and amplitude. Referring to FIG. 3, the waveforms I and Q are shown including an offset error which shifts the symmetry of the waveforms I and Q above the zero baseline. Referring to FIG. 1, offset errors may be caused by offset voltages generated in amplifiers 38 and 40. In addition, some incremental encoders employ multiple photo diodes interconnected to form the photosensors 18 and 20. The electrical characteristics of these photo diodes are generally not perfectly matched to each other, and this mismatch can also produce offset errors. Although FIG. 3 shows the signals I and Q both offset from zero by the same amount, in practice the signals I and Q may each include offset errors which are different in magnitude and which may also be different in polarity from each other.

Figure 4:
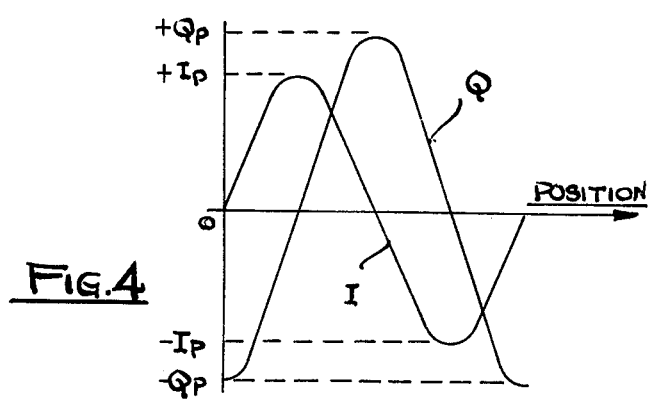
FIG. 4 is a graphic illustration showing output signals from the encoder of FIG. 1 which include amplitude errors.

In FIG. 4 the signals I and Q are shown in which the peak-to-peak amplitude of the signal Q is different in value from the peak-to-peak amplitude of the signal I. Under ideal conditions, the signals I and Q have exactly the same peak-to-peak amplitudes as shown in FIG. 2. In actual practice, however, variations in the electrical characteristics of the photosensors 18 and 20 and variations in the gains of the amplifiers 38 and 40 result in the signals I and Q having different peak-to-peak amplitudes, where this difference in amplitude represents the amplitude error. In FIG. 4, the peak-to-peak amplitude of the signal Q is shown to be greater than the corresponding amplitude of the signal I. However, it is equally probable that the signal I will have a greater amplitude than the signal Q. Further, the signals I and Q will usually contain both offset errors as shown in FIG. 3 and amplitude errors as shown in FIG. 4.

In prior art servo control systems, manually adjustable circuit elements, usually in the form of potentiometers, are provided in association with the amplifiers 38 and 40 to permit individual adjustment of these amplifiers to correct for offset and amplitude errors. These potentiometers must be individually adjusted by trained personnel using electronic test equipment to verify the adjustments. It is the nature of the error signals that they may vary as a function of both time and temperature, due to changes in component characteristics. Accordingly, the manual adjustments provided in the prior art systems must be readjusted on a periodic basis to maintain control accuracy. The digital error correcting circuits of the present invention completely eliminate the need for manual adjustments in the following manner.

Figure 5:
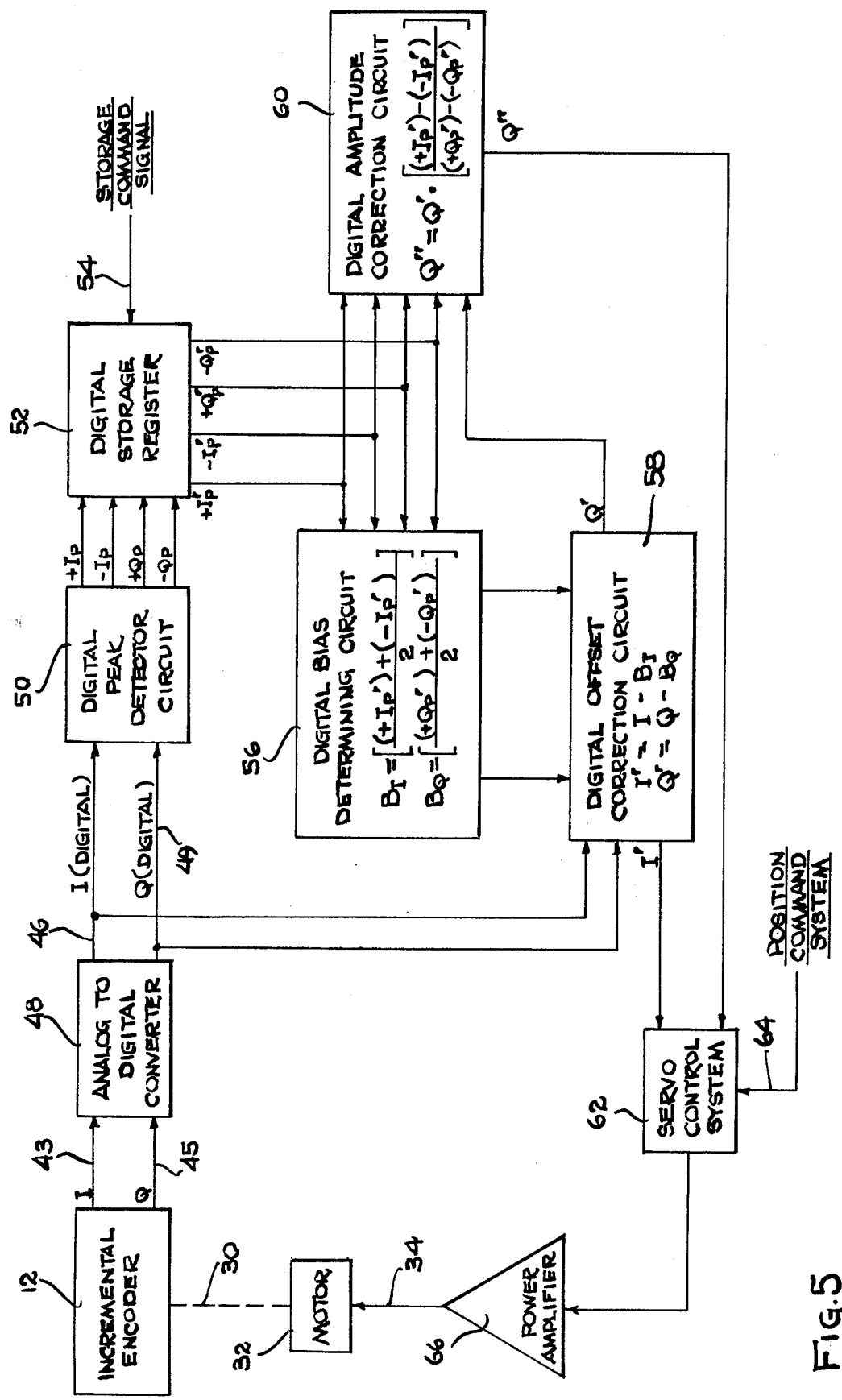
FIG. 5 is a block diagram showing the major components of the digital error correcting circuitry of the present invention.

FIG. 5 is a block diagram showing the major components of the digital error correcting circuitry of the present invention used in conjunction with a servo control system to control the motor 32 to position the movable control member 33. The signals I and Q appearing on the lines 43 and 45 from the incremental encoder 12 are in analog form as shown in FIG. 2. Each of these analog signals I and Q are converted to digital form by means of a multiplexed analog to digital converter 48. The analog signals I and Q are provided as input signals to the converter 48, which is capable of converting two analog signals to two digital signals, each represented by a binary number. The converter 48 is of sufficiently high speed to provide accurate conversion of the signals I and Q at the maximum rate of rotation of the output shaft 30 of the motor 32. The digitized signals I and Q appear on lines 46 and 49 and are provided as input signals to a digital peak detector circuit 50. The purpose of the peak detector circuit 50 is to detect both the maximum and minimum peak amplitudes of the signals I and Q. Referring to FIG. 4, it can be seen that these maximum and minimum values represent the positive and negative peaks, respectively, of the sine and cosine waves. For the signal I, these peak values are referred to as $+I_p$ and $-I_p$ and for the signal Q these values are referred to as $+Q_p$ and $-Q_p$. The circuit 50 operates by sampling the signals I and Q at a high sampling rate. The present sample value is compared to the previously sampled value to detect when the waveforms I and Q have reached minimum and maximum values. Output signals from the circuit 50, represent the positive and negative peak amplitudes of the waveforms I and Q as they are being generated by the encoder 12. These signals $+I_p$, $-I_p$, $+Q_p$ and $-Q_p$ are provided as input signals to a digital storage register 52. The register 52 also receives a storage command signal appearing on line 54. In response to the storage command signal, the storage register 52 stores and holds the peak amplitude values as detected by the circuit 50. The storage register 52 provides output signals $+I_p'$, $-I_p'$, $+Q_p'$ and $-Q_p'$, representing, respectively the stored values of the signals $-I_p$, $-I_p$, $+Q_p$ and $-Q_p$. Accordingly, in response to each storage command signal appearing on the line 54, the peak amplitude values stored by the register 52 are revised or updated with the latest peak amplitude values as detected by the detector circuit 50.

The output signals from the storage register 52 are provided as input signals to a digital bias determining circuit 56, as shown in FIG. 5. The purpose of the circuit 56 is to provide bias signals $B_I$ and $B_Q$ of the proper polarity and magnitude to correct the waveforms I and Q, respectively, for offset errors. Referring to FIG. 3, it can be shown that the amount that each of the waveforms I and Q are offset from the zero baseline is equal to one-half the sum of the positive peak amplitude and the negative peak amplitude of that waveform. If the waveform is perfectly symmetric about the zero baseline, the negative peak amplitude is exactly equal in magnitude and opposite in polarity to the positive peak amplitude. Accordingly, the sum of the positive and negative peak amplitudes is zero, resulting in a zero bias signal. In accordance with the above discussion, the bias determining circuit 56 generates the bias signals $B_I$ and $B_Q$, which represent the offset values of the waveforms I and Q, by means of digitally solving the equations shown within the block 56 of FIG. 5.

The bias signals $B_I$ and $B_Q$ from the circuit 56 are provided as input signals to a digital offset correction circuit 58, along with the digitized signals I and Q from the analog to digital converter 48. The offset correction circuit 58 corrects the signals I and Q for offset errors by subtracting the bias signals $B_I$ and $B_Q$ from the signals I and Q, respectively, resulting in signals I' and Q', representing the digital signals I and Q corrected for offset errors.

The signal Q' from the circuit 58 is provided as an input signal to a digital amplitude correction circuit 60 along with the stored peak amplitude signals from the register 52, as shown in FIG. 5. The purpose of the amplitude correction circuit 60 is to modify the peak-to-peak amplitude of the signal Q' so that it is equal to the peak-to-peak amplitude of the signal I'. It should be noted that the peak-to-peak amplitudes of the signals I' and Q' are identical to the peak-to-peak amplitudes of the signals I and Q, since the means for correcting the signals I and Q for offset errors does not alter the peak-to-peak amplitudes of these signals.

The amplitude correction circuit 60 employs the stored peak amplitude values $+I_p'$, $-I_p'$, $+Q_p'$ and $-Q_p'$ from the register 52 to calculate an amplitude correction factor for the signal Q'. Referring to FIG. 4, it can be shown that the peak-to-peak amplitudes of the waveforms I and Q are equal to the difference between the positive and negative peak amplitudes of these waveforms, respectively. Further, the relationship between the peak-to-peak amplitude of the waveform Q and the peak-to-peak amplitude of the waveform I is the ratio between the peak-to-peak amplitudes of the two waveforms. The digital amplitude correction circuit 60 employs these relationships as shown by the equation in block 60 of FIG. 5 to correct the peak-to-peak amplitude of the signal Q' so that it is equal to the peak-to-peak amplitude of the signal I'. The result is an output signal Q'' from the circuit 60 which has been corrected in amplitude to be equal to the amplitude of the signal I'. Because the amplitude correcting circuitry described above normalizes the peak amplitudes of the signals I and Q to the same value, it is only necessary to adjust the amplitude of one of these signals to match the amplitude of the remaining signal. Therefore, the digital amplitude correction circuit 60 need only provide amplitude correction for the waveform Q.

The signal I' from the circuit 58 and the signal Q'' from the circuit 60 are both provided as input signals to a servo control system 62. The servo control system 62 employs the signals I' and Q'' to derive a signal representing the position of the output shaft 30 of the motor 32 using any of several techniques well known to those skilled in the art. For example, one prior art technique employs the detection of the zero crossings of the waveforms I and Q to determine position. Because the signals I' and Q'' have been corrected for offset errors, the shifting of the zero crossing points caused by these offset errors (compare FIGS. 2 and 3) has been eliminated, resulting in a more accurate determination of the position of the shaft 30.

The position signal derived by the servo control system 62 is compared to an external position command signal provided to control system 62 on line 64 as shown in FIG. 5. In response to the difference between the position command signal and the position signal representing the actual position of the shaft 30, the control system 62 provides an output signal to a power amplifier 66. The amplifier 66 in turn provides the motor drive signal 34 used to control the motor 32 to rotate the shaft 30 and to position the control member 33, as shown in FIG. 1. The servo system 62 may be in the form of either an analog or a digital type of control system. In the instance of an analog control system, the signals I' and Q'' are converted to analog signals by means of conventional digital to analog conversion techniques.

From the above discussion, it can be seen that the digital error correcting circuitry of the present invention employs the peak amplitude values of the signals I and Q to correct these signals for both offset and amplitude errors. The point at which the storage register 52 is commanded to store the peak amplitude values of the signals I and Q is determined by the occurrence of the storage command signal appearing on the line 54. By providing the storage command signal on a periodic basis, the contents of the storage register 52 are revised or updated with the last peak amplitude values detected by the circuit 50. This configuration permits the digital error correcting circuitry to automatically compensate for changes or drifts in the errors produced by the encoder 12. Such error drift might be caused by, for example, changes in the temperature of the encoder 12.

In the preferred embodiment the storage command signal is provided to the register 52 each time operating power is provided to the circuitry shown in FIG. 5. Accordingly, the contents of the register 52 are revised each time the servo control system 62 is placed into operation, ensuring that the error correcting circuitry is operating in response to a recent measure of the peak amplitude values of the signals I and Q. Alternatively, the storage command signal can be programmed to update the register 52 at more frequent intervals, if necessary, to compensate for drift in the encoder 12.

While the preferred embodiment described above compensates for both offset and amplitude errors, the digital error correcting circuitry may also be used to correct for only offset errors or only amplitude errors. For example, if amplitude correction is not desired, the correction circuit 60 may be eliminated, and the offset corrected signals I' and Q' from the circuit 58 are both directly provided to the control system 62. On the other hand, if offset error correction is not desired, the circuits 56 and 58 may be eliminated. The signal Q' presently provided to the circuit 60 is replaced by the digital signal Q appearing on the line 49 from the converter 48. The signal Q is thus amplitude corrected by the circuit 60 to have the same peak-to-peak amplitude as the signal I. The resulting amplitude corrected signal Q'' is provided as an input signal to the system 62 along with the signal I appearing on the line 46 from the converter 48.

In yet another embodiment of the present invention, the signals I and Q (or I' or Q') may be amplitude corrected so that their peak-to-peak amplitude is made equal to the peak-to-peak amplitude of a third signal. For example, referring to FIG. 5 the amplitude of the signal Q' may be corrected in the following manner so that it is equal to the amplitude of a third signal A having peak amplitudes defined as $+A_p$ and $-A_p$. The peak amplitude values $+A_p$ and $-A_p$ are provided to the correction circuit 60 in place of the signals $+I_p'$ and $-I_p'$, whereby the values $+A_p$ and $-A_p$ are substituted for the values $+I_p'$ and $-I_p'$ in the equation shown in the block 60. In this manner the resultant signal Q'' represents the signal Q' adjusted in amplitude to be equal to the peak-to-peak amplitude of the signal A.

As will be understood by those skilled in the art, the various digital processing functions shown in FIG. 5 may be implemented in any of a number of different ways. However, the preferred embodiment of the invention utilizes an integrated circuit microprocessor. Such integrated circuit microprocessors are well known and include all the input-output, memory, logic and control circuitry of a special purpose digital computer in miniature form. In general, such circuits have both random access memory (RAM memory) and read only memory (ROM memory). The ROM memory has connections formed by masking operations during the construction of the basic circuitry to provide a completely wired circuit which includes the program for controlling the operation of the microprocessor to perform the digital functions shown in FIG. 5. Such an arrangement is often described as a dedicated memory circuit. The RAM memory of the circuit is utilized for storage of the various transient bits of information during the operation of the circuitry.

While the invention is thus disclosed and the presently preferred embodiment described in detail, it is not intended that the invention be limited to the shown embodiment. Instead, many modifications will occur to those skilled in the art which lie within the spirit and scope of the invention. For example, while there is shown the use of an incremental optical encoder for providing output signals which represent the position of a movable control element, the digital error correcting circuitry of the present invention may also be used with a variety of other transducers such as tachometers, resolvers, differential transformers, and the like. Such transducers typically provide the same types of output signal waveforms as described herein for angular position encoders. It is, accordingly, intended that the invention be limited only by the appended claims.

What is claimed is:

1. Digital error correcting circuitry, for correcting signals for offset errors, comprising:

means for providing the signals in digital form and which signals have a first phase relationship when a first signal leads a second signal identifying a first direction, and a second phase relationship when the first signal lags the second signal identifying a second direction;

detection means for detecting the peak amplitude values of each of the signals;

storage means for storing the detected peak amplitude values of each of the signals, in response to a storage command signal and which may store such peak amplitude values for an indefinite time period, which may substantially exceed the time required for correction of signals for offset errors;

bias determining means responsive to the stored peak amplitude values, including the last of the stored peak amplitude values and which may have been stored for a substantial period of time, for providing a bias signal for each of the signals to be corrected, each bias signal having a magnitude and polarity equal to the offset from a zero baseline of a respective one of the signals to be corrected; and offset correction means responsive to the bias signal and to the signals to be corrected, for applying the bias signals to the signals to be corrected in such manner to be additive to or subtractive from the signals to be corrected, whereby the offset errors are cancelled by the bias signals.

2. Digital error correcting circuitry for correcting first and second signals for amplitude errors, comprising:

means for providing the first and second signals in digital form;

detection means for detecting the peak amplitude values of the first and second signals;

storage means for storing the detected peak amplitude values of the first and second signals, in response to a storage command signal; and amplitude correction means, responsive to the stored peak amplitude values of the first and second signals for determining the ratio of the peak-to-peak amplitude of the first signal to the peak-to-peak amplitude of the second signal and for providing an amplitude correction factor, said amplitude correciton factor being applied to at least one of the first and second signals in such manner to raise or lower the amplitude of one of the first or second signals relative to the other so that the peak-to-peak amplitude of the second signal is made equal to the peak-to-peak amplitude of the first signal.

3. Digital error correcting circuitry for correcting first and second signals for offset and amplitude errors, comprising:

means for providing the first and second signals in digital form;

detection means for detecting the peak amplitude values of the first and second signals;

storage means for storing the detected peak amplitude values of the first and second signals, in response to a storage command signal;

bias determining means responsive to the stored peak amplitude values for providing first and second bias signals, each having a magnitude and polarity equal to the offset from a zero baseline of a repective one of the first and second signals;

offset correction means responsive to the first and second bias signals and to the first and second signals for applying the first and second bias signals to the first and second signals, respectively, whereby the offset errors of the first and second signals are cancelled by the first and second bias signals, respectively, providing first and second offset corrected signals; and amplitude correction means responsive to the stored peak amplitude values of the first and second signals and to the second offset corrected signal for determining the ratio of the peak-to-peak amplitude of the first signal to the peak-to-peak amplitude of the second signal and for providing an amplitude correction factor, said amplitude correction factor being applied to at least one of the first and second signals to raise or lower the amplitude of one of the signals relative to the other so that the peak-to-peak amplitude of the second offset corrected signal is made equal to the peak-to-peak amplitude of the first offset corrected signal.

4. The digital error correcting circuitry of either of claims 2 or 3 in which the means for providing the signals in digital form includes analog to digital conversion means.

5. The digital error correcting circuitry of either of claims 2 or 3 in which the storage means includes a digital storage register whose contents are revised in response to the storage command signal.

6. The digital error correcting circuitry of claim 5 in which the storage command signal is provided each time the circuitry is furnished with operating power.

7. The digital error correcting circuitry of claim 3 in which the bias determining means includes means for determining one-half the sum of the positive peak amplitude and negative peak amplitude of each signal to be corrected.

8. The digital correcting circuitry of claim 3 in which the offset correction means includes means for subtracting the bias signals from the signals to be corrected.

9. A method of digitally correcting signals for offset errors, comprising the steps of:

providing the signals in digital form and which signals have a first phase relationship when a first signal leads a second signal identifying a first direction, and a second phase relationship when the first signal lags the second signal identifying a second direction;

detecting the peak amplitude values of each of the signals;

storing the detected peak amplitude values of each of the signals in response to a storage command signal for an indefinite time period;

providing bias signals for each of the signals to be corrected in response to the stored peak amplitude values, including the last of the stored peak amplitude values which may have been stored for a substantial period of time, where each bias signal has a magnitude and polarity equal to the offset from a zero baseline of a respective one of the signals to be corrected; and applying the bias signals to the signals to be corrected, in such manner to be additive to or subtractive from the signals to be corrected, whereby the offset errors are cancelled by the bias signals.

10. A method of digitally correcting first and second signals for amplitude errors, comprising the steps of:
   providing the first and second signals in digital form;
   detecting the peak amplitude values of the first and second signals;
   storing the detected peak amplitude values of the first and second signals in response to a storage command signal;
   determining the ratio of the peak-to-peak amplitude of the first signal to the peak-to-peak amplitude of the second signal;
   providing an amplitude correction factor in response to the stored peak amplitude correction factor to the second signal to raise or lower the amplitude of one of the signals relative to the other so that the peak-to-peak amplitude of the second signal is made equal to the peak-to-peak amplitude of the first signal.

11. A method of digitally correcting first and second signals for offset and ammplitude errors, comprising the steps of:
   providing the first and second signals in digital form;
   detecting the peak amplitude values of the first and second signals;
   storing the detected peak amplitude values of the first and second signals in response to a storage command signal;
   providing first and second bias signals in response to the stored peak amplitude values, where each bias signal has a magnitude and polarity equal to the offset from a zero baseline of a respective one of the first and second signals;
   applying the first and second bias signals to the first and second signals respectively, in such manner to be additive to or subtractive from the first and second signals, whereby the offset errors are cancelled by the bias signals, providing first and second offset corrected signals;
   determining the ratio of the peak-to-peak amplitude of the first signal to the peak-to-peak amplitude of the second signal;
   providing an amplitude correction factor in response to the stored peak amplitude values of the first and second signals; and
   applying the amplitude correction factor to the second offset corrected signal to raise or lower the amplitude of one of the offset corrected signals relative to the other so that the peak-to-peak amplitude of the second offset corrected signal is made equal to the peak-to-peak amplitude of the first offset corrected signal.

12. The method of either of claims 10 or 11 in which the step of providing the signals in digital form includes the step of converting the signals from analog to digital form.

13. The method of either of claims 10 or 11 in which the step of storing the detected peak amplitude values in response to a storage command signal includes the step of providing the storage command signal each time operating power is furnished.

14. The method of either of claims 9 or 11 in which the step of providing bias signals includes the step of determining one half the sum of the positive peak amplitude and the negative peak amplitude of each signal to be corrected.

15. The method of either of claims 9 or 11 in which the step of applying bias signals to the signals to be corrected includes the step of subtracting the bias signals from the signals to be corrected.

16. Digital error correcting circuitry, for correcting signals for offset errors, comprising:
   means for providing the signals in digital form;
   detection means for detecting the peak amplitude values of each of the signals;
   storage means for storing the detected peak amplitude values of each of the signals, in response to a storage command signal;
   bias determining means responsive to the stored peak amplitude values, for providing a bias signal for each of the signals to be corrected, each bias signal having a magnitude and polarity equal to the offset from a zero baseline of a respective one of the signals to be corrected;
   amplitude correction means responsive to the stored peak amplitude values of the first and second signals and providing an amplitde corrected signal;
   offset correction means responsive to the bias signals and to the signals to be corrected, for applying the bias signals to the signals to be corrected, in such manner to be additive to or subtractive from the signals to be corrected, whereby the offset errors are cancelled by the bias signals to provide offset corrected signals; and
   means for receiving the offset corrected signals and amplitude corrected signal for providing a combined corrected signal.

17. The digital error correcting circuitry of claim 18 in which the bias determining means includes means for determining one-half the sum of the positive peak amplitude and negative peak amplitude of each signal to be corrected.

18. The digital error correcting circuitry of claim 16 in which the offset correction means includes means for subtracting the bias signals from the signals to be corrected.

19. Digital error correcting circuitry for correcting first and second signals for amplitude errors, comprising:
   means for providing the first and second signals in digital form and which signals have a first phase relationship when the first signal leads the second signal identifying a first direction, and a second phase relationship when the first signal lags the second signal identifying a second direction;
   detection means for detecting the peak amplitude values of the first and second signals;
   storage means for storing the detected peak amplitude values of the first and second signals, in response to a storage command signal and which stores said peak amplitude values for an indefinite period of time; and
   amplitude correction means, responsive to the stored peak amplitude values, including the last of the stored peak amplitude values, of the first and second signals and to the second signal, for providing an amplitude correction factor, said amplitude correction factor being applied to at least one of said first or second signals in such manner to raise or lower the amplitude of one of the first or second signals relative to the other so that the peak-to-peak amplitude of the second signal is made equal to the peak-to-peak amplitude of the first signal.

20. The digital error correcting circuitry of claim 19 in which the amplitude correction means includes means for determining the ratio of the peak-to-peak amplitude of the first signal to the peak-to-peak amplitude of the second signal.

21. A method of digitally correcting signals for offset errors, comprising the steps of:
providing the signals in digital form;
detecting the peak amplitude values of each of the signals;
storing the detected peak amplitude values of each of the signals in response to a storage command signal;
providing an amplitude corrected signal in response to the stored peak amplitude values;
providing bias signals for each of the signals to be corrected in response to the stored peak amplitude values, where each bias signal has a magnitude and polarity equal to the offset from a zero baseline of a respective one of the signals to be corrected; and
applying the bias signals to the signals to be corrected, in such manner to be additive to or subtractive from the signals to be corrected whereby the offset errors are cancelled by the bias signals.

22. The method of claim 21 in which the step of providing the signals in digital form includes the step of converting the signals from analog to digital form.

23. The method of claim 21 in which the step of storing the detected peak amplitude values in response to a storage command signal includes the step of providing the storage command signal each time operating power is furnished.

24. The method of claim 21 in which the step of providing bias signals includes the step of determining one half the sum of the positive peak amplitude and the negative peak amplitude of each signal to be corrected.

25. The method of claim 21 in which the step of applying bias signals to the signals to be corrected includes the step of subtracting the bias signals from the signals to be corrected.

26. A method of digitally correcting first and second signals for amplitude errors, comprising the steps of:
providing the first and second signals in digital form wherein said signals have a first phase relationship when the first signal leads the second signal identifying a first direction, and a second phase relationship when the first signal lags the second signal identifying a second direction;
detecting the peak amplitude values of the first and second signals;
storing the detected peak amplitude values of the first and second signals in response to a storage command signal and which storing of the peak amplitude values is for an indefinite period of time;
providing an amplitude correction factor in response to the stored peak amplitude values including the last of the stored peak amplitude values of the first and second signals; and
applying the amplitude correction factor to the second signal in such manner to raise or lower the amplitude of the second signal relative to the first signal so that the peak-to-peak amplitude of the second signal is made equal to the peak-to-peak amplitude of the first signal.

27. The method of claim 26 in which the step of providing an amplitude correction factor includes the step of determining the ratio of the peak-to-peak amplitude of the first signal to the peak-to-peak amplitude of the second signal.

* * * * *